United States Patent
Sethi et al.

(10) Patent No.: US 12,432,164 B2
(45) Date of Patent: Sep. 30, 2025

(54) WORKLOAD MANAGEMENT BETWEEN EDGE COMPUTING SITES

(71) Applicant: Dell Products L.P., Round Rock, TX (US)

(72) Inventors: Parminder Singh Sethi, Ludhiana (IN); Lakshmi Saroja Nalam, Bangalore (IN); Durai S. Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 18/494,899

(22) Filed: Oct. 26, 2023

(65) Prior Publication Data

US 2025/0141815 A1    May 1, 2025

(51) Int. Cl.
*H04L 47/83* (2022.01)
*H04L 41/16* (2022.01)
*H04L 47/70* (2022.01)
*H04L 47/762* (2022.01)

(52) U.S. Cl.
CPC .............. *H04L 47/83* (2022.05); *H04L 41/16* (2013.01); *H04L 47/762* (2013.01); *H04L 47/826* (2013.01)

(58) Field of Classification Search
None
See application file for complete search history.

(56) References Cited

U.S. PATENT DOCUMENTS

| | | | | |
|---|---|---|---|---|
| 11,343,202 B1 * | 5/2022 | Anshuman | ............ | H04L 47/76 |
| 2021/0109584 A1 * | 4/2021 | Guim | ................ | H04L 41/5003 |
| 2022/0131931 A1 * | 4/2022 | Bikumala | ........... | G06F 16/2379 |
| 2022/0239596 A1 * | 7/2022 | Kumar | ..................... | H04L 43/02 |
| 2023/0123841 A1 * | 4/2023 | Fan | .......................... | G06F 9/505 718/1 |
| 2023/0273665 A1 * | 8/2023 | Robillard | ................ | G06F 9/505 |
| 2024/0103991 A1 * | 3/2024 | Yue | ......................... | G06N 3/045 |
| 2024/0135229 A1 * | 4/2024 | Bandyopadhyay | .... | G06N 20/00 |

(Continued)

OTHER PUBLICATIONS

Wikipedia, "Fog Computing," https://en.wikipedia.org/wiki/Fog_computing, Sep. 2, 2023, 6 pages.

(Continued)

*Primary Examiner* — June Sison
(74) *Attorney, Agent, or Firm* — Ryan, Mason & Lewis, LLP

(57) ABSTRACT

A method comprises receiving data corresponding to operation of a plurality of edge devices from respective ones of a plurality of edge computing sites. The data comprises requests received by the edge devices to perform a plurality of tasks. The data is analyzed using a first machine learning algorithm to determine workloads of respective ones of the edge devices. The method further comprises predicting future workloads of the edge devices. The predicting is performed using a second machine learning algorithm and is based on the determined workloads of the edge devices. A determination is made whether to transfer at least a portion of one or more of the tasks from a first edge device to a second edge device. The first and second edge devices are located at first and second edge computing sites, respectively, and the determination is based on one or more of the predicted future workloads.

20 Claims, 9 Drawing Sheets

(56) References Cited

U.S. PATENT DOCUMENTS

2024/0232677 A9* 7/2024 Bandyopadhyay .... G06N 20/00
2024/0303129 A1* 9/2024 White ................... G06F 9/505

OTHER PUBLICATIONS

Wikipedia, "Ridge Regression," https://en.wikipedia.org/w/index.php?title=Ridge_regression&oldid=1172832572, Aug. 29, 2023, 8 pages.

J. Brownlee, "Time Series Forecasting With Prophet in Python," https://machinelearningmastery.com/time-series-forecasting-with-prophet-in-python/, May 8, 2020, 24 pages.

* cited by examiner

WORKLOAD MANAGEMENT BETWEEN EDGE COMPUTING SITES

FIELD

The field relates generally to information processing systems, and more particularly to management of workloads for edge devices.

BACKGROUND

An edge computing architecture moves at least a portion of data processing to the periphery of a network to be closer to a data source rather than to a centralized location. For example, instead of transmitting raw data to a centralized location to be processed and analyzed, such tasks or workloads are performed at or near locations where the data is actually generated. In this manner, for example, network parameters such as bandwidth can be increased, while network parameters such as latency and congestion can be reduced, thus improving overall network reliability.

Edge computing has been driven by an exponential increase in real-time applications that require minimal latency and smoother operation. Edge computing is changing rapidly as more users utilize different types of devices at an increasing rate. Despite the benefits of edge computing, there are challenges such as, for example, defining edge infrastructure requirements and efficient management of requests and services across edge devices.

SUMMARY

Embodiments provide an edge infrastructure management platform in an information processing system.

For example, in one embodiment, a method comprises receiving data corresponding to operation of a plurality of edge devices from respective ones of a plurality of edge computing sites, wherein the data comprises a plurality of requests received by the plurality of edge devices to perform a plurality of tasks. The data is analyzed using at least a first machine learning algorithm to determine workloads of respective ones of the plurality of edge devices. The method further comprises predicting future workloads of the respective ones of the plurality of edge devices over a future time period, wherein the predicting is performed using at least a second machine learning algorithm and is based at least in part on the determined workloads of the respective ones of the plurality of edge devices. A determination is made whether to transfer at least a portion of one or more of the plurality of the tasks from a first edge device of the plurality of edge devices to a second edge device of the plurality of edge devices. The first edge device is located at a first edge computing site and the second edge device is located at a second edge computing site, and the determination of whether to transfer is based at least in part on one or more of the predicted future workloads.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Figure 1:
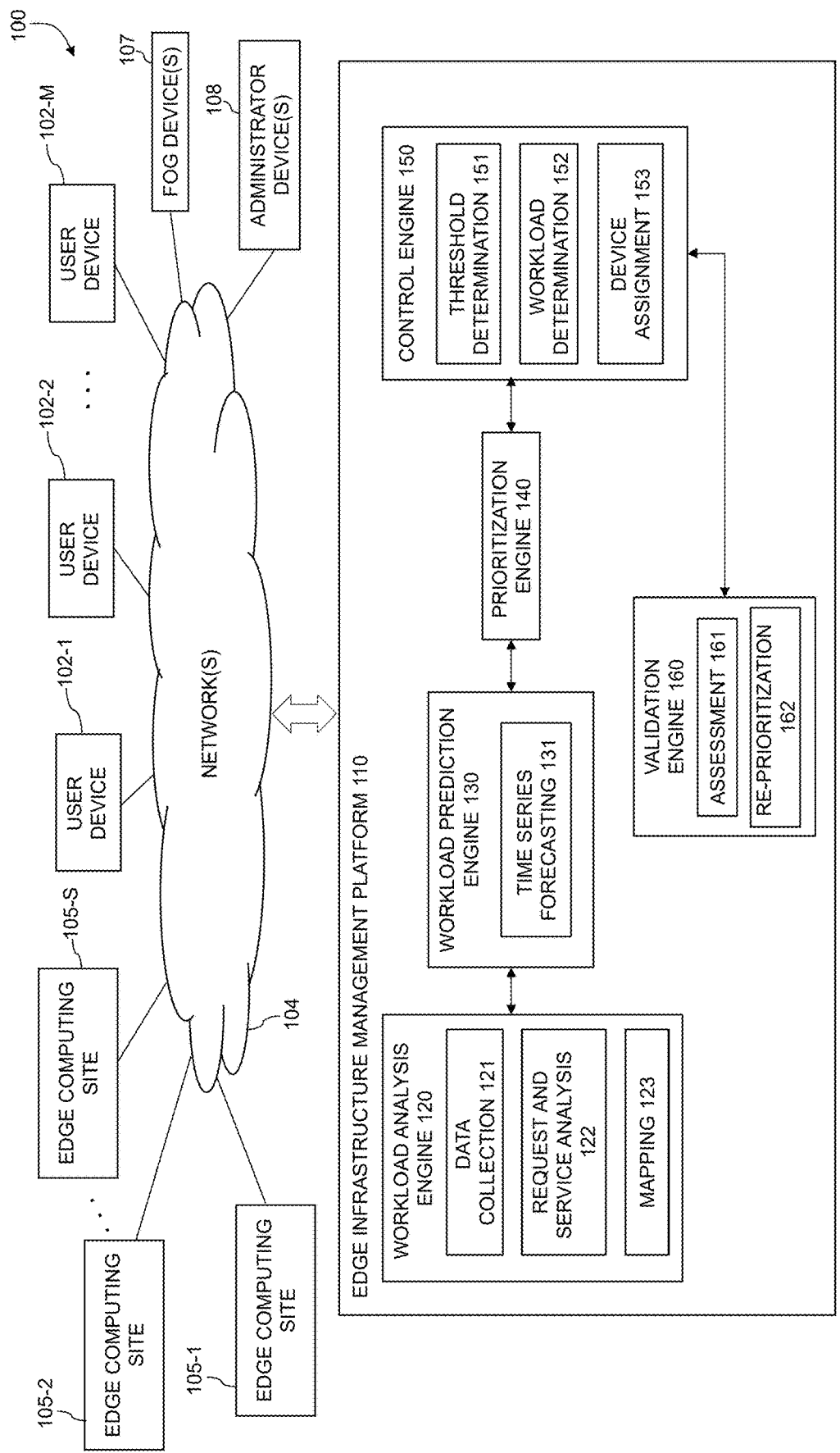
FIG. 1 depicts an information processing system with an edge infrastructure management platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous, and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises user devices 102-1, 102-2 . . . 102-M (collectively "user devices 102"), edge computing sites 105-1, 105-2, . . . 105-S (collectively "edge computing sites 105"), one or more fog devices 107 and one or more administrator devices 108.

The user devices 102, edge computing sites 105, fog devices 107 and administrator devices 108 communicate over a network 104 with each other and/or an edge infrastructure management platform 110. The variable M and other similar index variables herein such as K, L and S are assumed to be arbitrary positive integers greater than or equal to one.

The user devices 102, fog devices 107 and administrator devices 108 can comprise, for example, Internet of Things (IoT) devices, desktop, laptop or tablet computers, mobile telephones, or other types of processing devices capable of communicating with the edge infrastructure management platform 110 over the network 104. Such devices are examples of what are more generally referred to herein as "processing devices." Some of these processing devices are also generally referred to herein as "computers." The user devices 102, fog devices 107 and administrator devices 108 may also or alternately comprise virtualized computing resources, such as virtual machines (VMs), containers, etc. The user devices 102, fog devices 107 and administrator devices 108 in some embodiments comprise respective computers associated with a particular company, organization or other enterprise.

The terms "user." "customer" or "administrator" herein are intended to be broadly construed so as to encompass numerous arrangements of human, hardware, software or firmware entities, as well as combinations of such entities. Edge infrastructure management services may be provided for users utilizing one or more machine learning models, although it is to be appreciated that other types of infrastructure arrangements could be used. At least a portion of the available services and functionalities provided by the edge infrastructure management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the edge infrastructure management platform 110, as well as to support communication between the edge infrastructure management platform 110 and connected devices (e.g., user devices 102, fog devices 107 and administrator devices 108), connected sites (e.g., edge computing sites 105), and/or other related systems and devices not explicitly shown.

In some embodiments, the administrator devices 108 are assumed to be associated with repair technicians, system administrators, information technology (IT) managers, software developers, release management personnel or other authorized personnel configured to access and utilize the edge infrastructure management platform 110.

Figure 2:
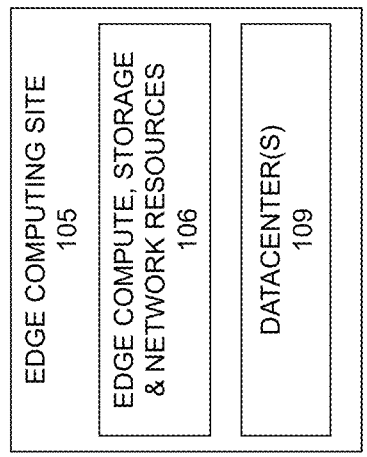
FIG. 2 depicts an edge computing site in an illustrative embodiment.

The edge computing sites 105 may each comprise one or more edge stations or other types and arrangements of edge nodes. Each of the edge computing sites 105 illustratively comprises a plurality of edge devices. Each such node of an edge computing site 105 comprises at least one processing device that includes a processor coupled to a memory. The edge computing sites 105 illustratively execute at least portions of various tasks for system users. Such tasks may comprise the execution of one or more applications. As used herein, the term "application" is intended to be broadly construed to encompass, for example, different types of services implemented in software executed by the edge computing sites 105. Such applications can include edge-hosted applications running on the edge computing sites 105. Referring to FIG. 2, an example edge computing site 105 comprises a set of edge compute, storage and/or network resources 106. A given such set of edge resources illustratively comprises at least one of edge compute, storage and network resources of one or more edge devices of the corresponding edge computing site. In addition, an edge computing site 105 may comprise one or more datacenters 109. Enterprises may have multiple datacenters within, for example, a single country or across multiple geographic regions. To reduce the transport of large amounts of raw data from datacenters to a service provider, enterprises may deploy their datacenters as part of edge environments (e.g., edge computing sites 105) across each region. Each datacenter processes and stores data locally and can be configured to replicate its data to other locations. As part of the edge compute, storage and/or network resources 106 and/or the datacenters 109, the edge computing sites 105 can include, for example, servers, routers, network switches and other interfacing equipment as edge devices.

Edge compute resources of the edge computing sites 105 can include, for example, various arrangements of processors, possibly including associated accelerators. Edge storage resources of the edge computing sites 105 can include, for example, one or more storage systems or portions thereof that are part of or otherwise associated with the edge computing sites 105. A given such storage system may comprise, for example, all-flash and hybrid flash storage arrays, software-defined storage systems, cloud storage systems, object-based storage systems, and scale-out distributed storage clusters. Combinations of multiple ones of these and other storage types can also be used in implementing a given storage system in an illustrative embodiment. Edge network resources of the edge computing sites 105 can include, for example, resources of various types of network interface devices providing particular bandwidth, data rate and communication protocol features.

One or more of the edge computing sites 105 each comprise a plurality of edge devices, with a given such edge device comprising a processing device that includes a processor coupled to a memory. The one or more edge computing sites 105 are each assumed to be implemented using at least one processing device of at least one processing platform. Each such processing device generally comprises at least one processor and an associated memory, and implements at least a portion of the functionality of the edge and core compute, storage and/or network resources. Such processing devices can illustratively include particular arrangements of edge compute, storage and network resources.

The fog devices 107 comprise a layer of devices between edge devices and cloud platforms. In illustrative embodiments, the fog devices 107 provide storage, applications, and data to end-users and comprise, for example, servers, storage devices or other processing devices that reside near edge devices. In some embodiments, multiple fog devices 107 are connected to each other and are connected to centralized cloud servers (e.g., over network 104). The fog devices 107 may be smaller than and have less processing power than the edge devices and can work together to handle operations such as, for example, pre-processing of data, short-term storage, and rule-based real-time monitoring. Fog devices 107 can include nodes that are physically close to but distinct from edge devices.

Figure 3:
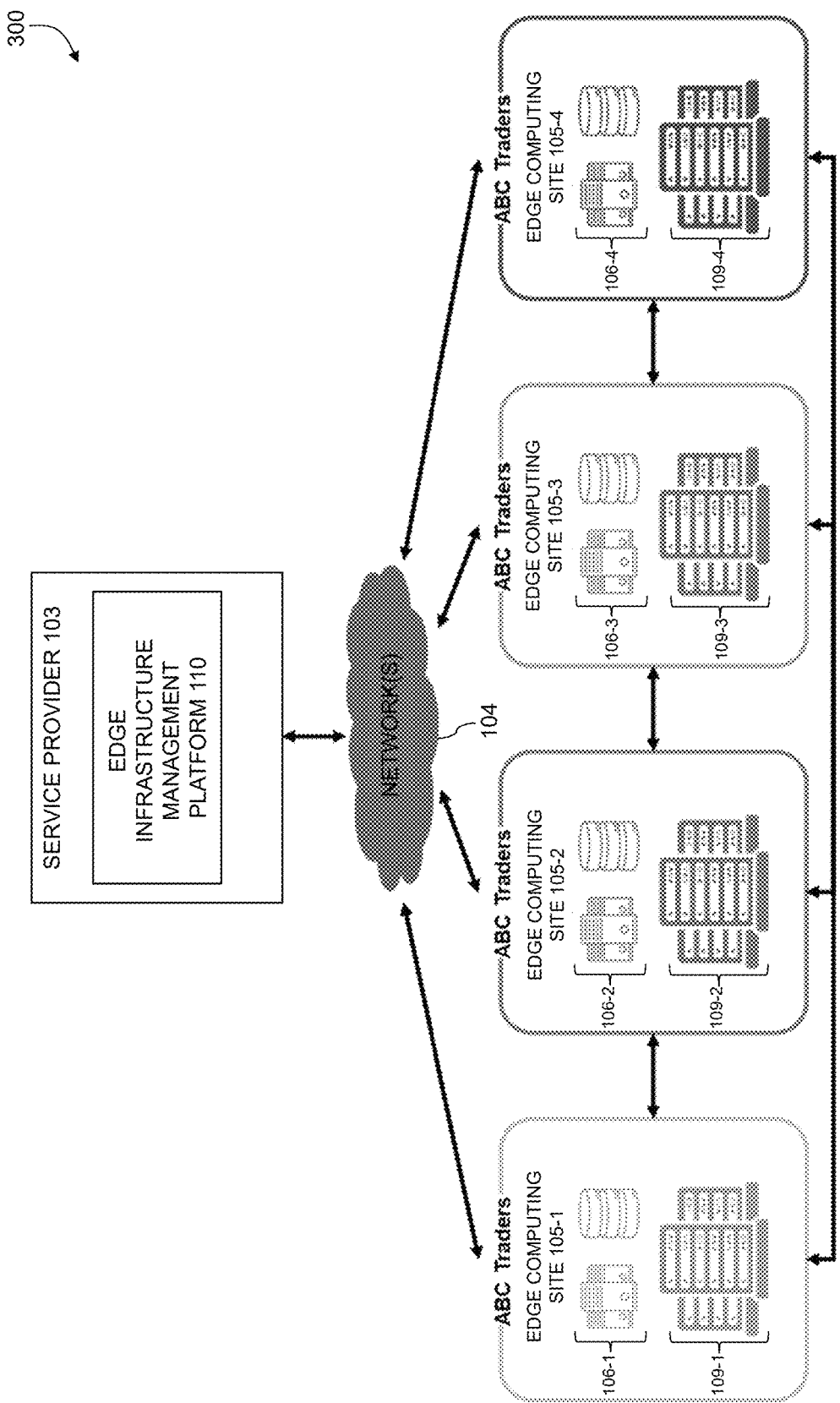
FIG. 3 depicts an operational architecture between a service provider and a plurality of edge computing sites in an illustrative embodiment.

The edge computing sites 105 provide distributed computing architectures that bring computing and storage closer to the sources of data. The edge computing sites 105 provide enterprises with the capability to quickly derive insights from large volumes of data, reduce costs of transporting large volumes of data, reduce security vulnerabilities, and permit retention of data locally for privacy reasons and/or compliance with regulations. Referring, for example, to the operational architecture 300 in FIG. 3, a service provider 103 (e.g., a technology service provider) may include an edge infrastructure management platform 110 to control and manage edge computing sites 105-1, 105-2, 105-3 and 105-4 including respective edge compute, storage and/or network resources 106-1, 106-2, 106-3 and 106-4 and datacenters 109-1, 109-2, 109-3 and 109-4. In the operational architecture 300, the edge computing sites 105-1, 105-2, 105-3 and 105-4 are in different geographic regions (e.g., Asia, America, Europe, Australia) or in different areas (e.g., cities, towns, boroughs, states, etc.) of the same geographic region and correspond to the same enterprise (e.g., ABC traders). The enterprise can be a customer of the service provider.

Figure 4:
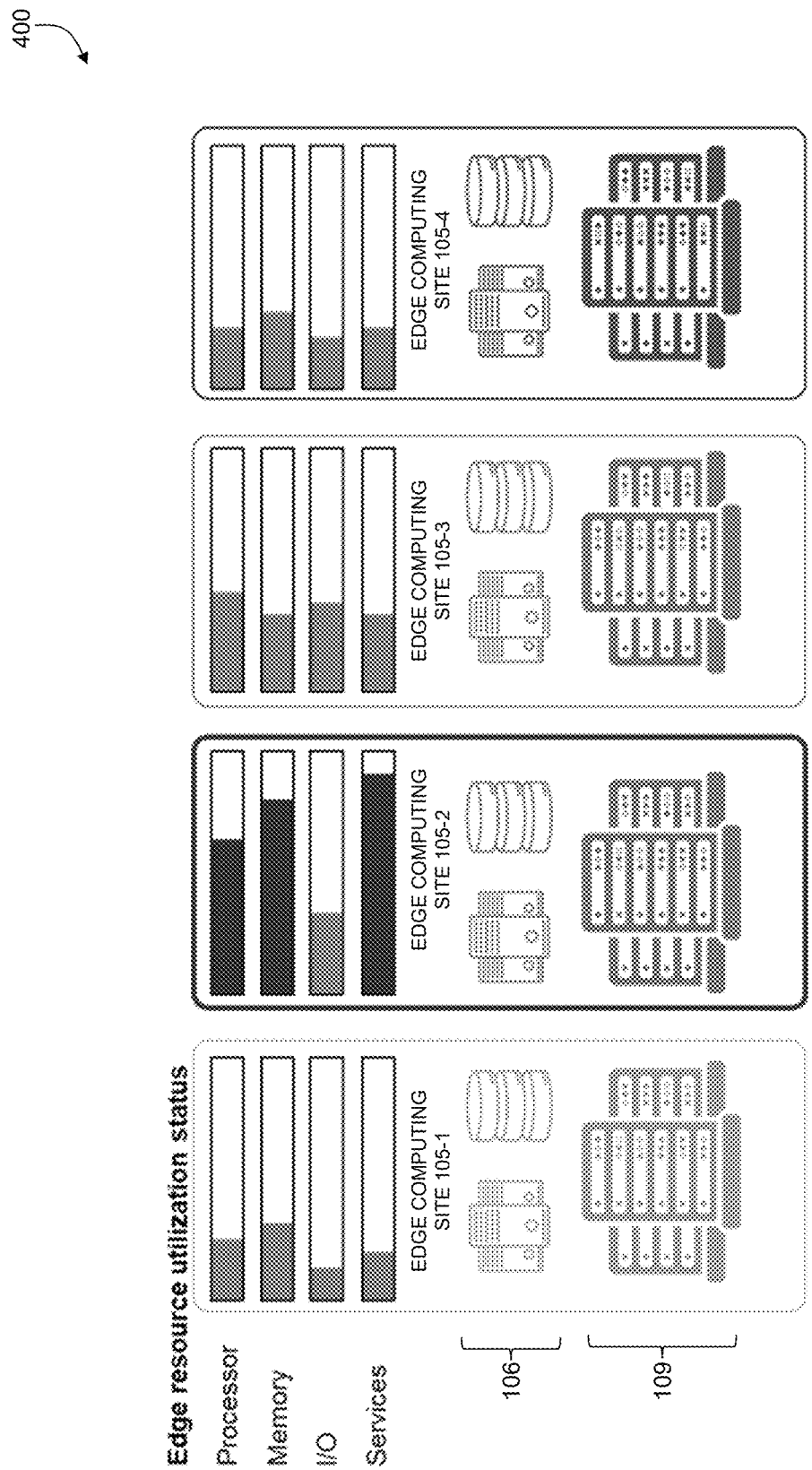
FIG. 4 depicts details of edge resource utilization status for a plurality of edge computing sites in an illustrative embodiment.

The number of devices and volume of data generated in a given datacenter may increase or decrease over time. With conventional approaches, it is difficult to determine the optimum number of edge devices to deploy in order to perform efficient computation and analysis of generated data. In addition, depending on the configuration of an edge environment (e.g., edge computing site) and the generated data, at any given instance, some edge devices/environments may have several services running, whereas other edge devices/environments may have fewer services running. This may impact the performance and computing capability of the edge devices/environments with the several services running. For example, the diagram 400 in FIG. 4 depicts details of edge resource utilization status for a plurality of edge computing sites 105-1, 105-2, 105-3 and 105-4. Each of the edge computing sites 105-1, 105-2, 105-3 and 105-4 includes edge compute, storage and/or network resources (collectively labeled 106) and a datacenter (collectively labeled 109). As can be seen in FIG. 4, processor (e.g., CPU) utilization, memory utilization and other services utilization are higher for edge computing site 105-2 than for the other edge computing sites 105-1, 105-3 and 105-4. The processor utilization, memory utilization and other services utilization for edge computing site 105-2 are approaching threshold maximum levels, which can lower performance and computing capability for edge computing site 105-2.

Illustrative embodiments advantageously provide techniques to lower edge resource utilization in edge computing sites that may be overburdened with task performance by moving tasks to other edge computing sites and/or fog devices and/or swapping high resource usage tasks with lower resource usage tasks to balance resource usage between edge computing sites and maintain designated levels of performance and computing capability. With current techniques, moving or swapping services between edge devices/environments is not available.

In an attempt to address the noted technical problems, the illustrative embodiments provide techniques to efficiently manage edge devices by determining workloads of edge devices, predicting future workloads of the edge devices and distributing tasks across different edge devices at different edge computing sites based on the predictions. The illustrative embodiments advantageously provide an edge infrastructure management platform 110 which uses a first machine learning algorithm to analyze a plurality of requests received by a plurality of edge devices to perform a plurality of tasks. Based on the analysis, workloads of respective ones of the plurality of edge devices are determined. Using a second machine learning algorithm, future workloads of the respective ones of the plurality of edge devices over a future time period are predicted based on the determined workloads of the respective ones of the plurality of edge devices. Based on the predicted future workloads, a determination is made whether to transfer at least a portion of one or more of the tasks from a first edge device located a first edge computing site to a second edge device located at a second edge computing site.

Referring back to FIG. 1, the edge infrastructure management platform 110 in the present embodiment is assumed to be accessible to the user devices 102, edge computing sites 105, fog devices 107 and/or administrator devices 108 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The edge infrastructure management platform 110 includes a workload analysis engine 120, a workload prediction engine 130, a prioritization engine 140, a control engine 150 and a validation engine 160. The workload analysis engine 120 includes a data collection layer 121, a request and service analysis layer 122 and a mapping layer 123. The workload prediction engine 130 includes a time series forecasting layer 131. The control engine 150 includes a threshold determination layer 151, a workload determination layer 152 and a device assignment layer 153. The validation engine 160 includes an assessment layer 161 and a re-prioritization layer 162.

In illustrative embodiments, the data collection layer 121 collects, for example, data corresponding to the operation of a plurality of edge devices from respective ones of the edge computing sites 105. The data collection layer 121 is also configured to collect data corresponding to the operation of the one or more fog devices 107. The data comprises, for example, a plurality of requests received by the plurality of edge devices to perform a plurality of tasks. For example, requests to perform tasks may be issued from one or more of the user devices 102. As noted herein above, tasks may comprise the execution of one or more applications. For example, devices may perform one or more tasks to provide one or more services, including but not necessarily limited to, data processing, data storage and retrieval, website access, generation of interfaces, generation of data visualizations or other visualizations, device monitoring, device diagnostics, device control, automated machine, systems or robot control and management, industrial processes, control of communications networks, and/or other processes for the provision of services.

The data corresponding to the operation of the edge devices of the edge computing sites 105 and/or fog devices 107 further comprises, for example, resource usage data by the edge devices and/or fog devices 107, network communications data associated with the edge devices and/or fog devices 107 and application execution data of the edge devices and/or fog devices 107. In some embodiments, the edge devices of an edge computing site 105 and/or the fog devices 107 may each include a software agent deployed thereon to monitor the operation of its corresponding device, to collect the data corresponding to the operation of its corresponding device and transmit the collected data over the network 104 to the workload analysis engine 120.

The data comprises, for example, device identifiers (e.g., device universally unique identifiers (UUIDs)), timestamps (e.g., times of operations and/or of requests for access to the devices), input/output (IO) parameters (e.g., throughput, IO operations per second (IOPS), latency), user information, requesting device identifiers, errors associated with a given operation, central processing unit (CPU) utilization, memory utilization and storage utilization of the edge devices and/or fog devices 107. The data further comprises, for example, network information including, but not necessarily limited to, network communication patterns (e.g., network volume at particular times), network conditions (e.g., latency, throughput, IOPS) and changes in network volume and/or conditions (e.g., sudden increases in volume/network traffic (e.g., spikes), sudden increases in latency or decreases in throughput and/or IOPs. The data also comprises, for example, information regarding application failures, crashes, errors or other issues with application performance.

As used herein, "operation" or "operations" are to be broadly construed and refer to, for example, transactions initiated by, for example, an invocation, API request or call to an application. The operations include, but are not necessarily limited to, read operations, write operations and/or subroutines used to, for example, perform application functions. The data collection layer 121 collects current or real-time operation data and resource utilization data corresponding to operations which are in progress or have been recently completed (e.g., within microseconds or milliseconds). In some embodiments, the collected data is in the form of one or more logs.

The request and service analysis layer 122 analyzes the collected data to determine workloads of respective ones of the edge devices and/or fog devices 107. Workloads comprise, for example, data and applications running as single components or several components working together, with the edge computing sites 105 and/or fog devices 107 providing computational resources to allow workloads to complete tasks. The size of a workload may be dependent on the amount of data and applications included in a given workload. Certain edge computing sites 105 and/or fog devices 107 may be better suited for certain types of workloads, depending on the characteristics of the workloads.

In determining the workloads of respective ones of the edge devices and/or fog devices 107, the request and service analysis layer 122 analyzes the types of requests that are received by a device, the tasks (e.g., services) needed to respond to the requests, and the number of requests that are received over one or more designated time periods (e.g., hour, day, etc.). The request and service analysis layer 122 analyzes parameters such as, but not necessarily limited to, request type, request processing time, count of requests, service name(s) that respond to the request, required input/outputs (IOs) to process and respond to the request, required CPU amounts to process and respond to the request, and/or required memory (e.g., RAM) to process and respond to the request.

In illustrative embodiments, workload is a dependent variable determined by using a regression machine learning algorithm, such as, for example, a Ridge regression algorithm. Ridge regression can be used with smaller training datasets, such that the training dataset is smaller than the testing dataset. The regression machine learning algorithm used in the illustrative embodiments optimizes the sum of squared residuals. For example, referring to the following formulas (1) and (2):

$$\text{Workload} = y-\text{axis intercept} + (\text{slope} * \text{request processing time}) + \ldots \quad (1)$$

$$\text{Ridge regression penalty} = \quad (2)$$
$$\lambda * (\text{slope}^2 + I/O \text{ offset}^2 + CPU \text{ offset}^2 + \ldots )$$

In the Ridge regression penalty function, $\lambda$ represents an alpha parameter. Adjusting the alpha values allows the penalty term to be regulated. When alpha is increased, the penalty increases, leading to a reduction in the magnitude of coefficients.

Referring to the ellipsis in formulas (1) and (2), in determining the workloads of the respective ones of the edge devices and/or fog devices 107, and the Ridge regression penalty, the regression machine learning algorithm analyzes one or more workload metrics, wherein in addition to "request processing time," "I/O offset" (I/O data size) and "CPU offset" (CPU utilization), the one or more workload metrics may further comprise at least one of a number of the requests received by the respective edge devices and/or fog devices 107, memory utilization of the respective edge devices and/or fog devices 107, network bandwidth associated with the respective edge devices and/or fog devices 107 and IOPS associated with the respective edge devices and/or fog devices 107. For example, in connection with formula (1), the ellipsis may represent slope*respective ones of additional workload metrics, and in connection with formula (2), the ellipsis may represent square of respective ones of additional workload metrics.

Based on the analysis by the request and service analysis layer 122 to identify the types of requests that are received by a device and the tasks (e.g., services) needed to respond to the requests, the mapping layer 123 maps respective ones of a plurality of requests to one or more services offered by respective ones of a plurality of edge devices and/or fog devices 107. The mapping layer 123 maintains the mapping of the requests and services in a repository along with the parameters that affect the workload of the edge devices and/or fog devices 107.

The workload prediction engine 130 and, more particularly, the time series forecasting layer 131, uses a time series forecasting machine learning algorithm to predict future workloads of respective ones of a plurality of edge devices and/or fog devices 107 over a future time period. The future time period may vary based on settings designated by a user or default settings. For example, the future time period may be the next 12 hours, 24 hours, 3 days, week, etc. The predictions are based at least in part on the workloads determined by the request and service analysis layer 122.

In illustrative embodiment, the time series forecasting machine learning algorithm comprises a Prophet algorithm. The Prophet library comprises an open-source library configured to make forecasts for univariate time series datasets. According to the embodiments, the time series forecasting machine learning algorithm automatically finds a set of hyperparameters for the model to make accurate forecasts for data with one or more trends. The algorithm implements an additive time series forecasting model to forecast non-linear trends with, for example, weekly and daily effects. In illustrative embodiments, the algorithm is automated to output a forecast based on the workloads determined by the request and service analysis layer 122, as well as one or more workload metrics including, but not necessarily limited to request path, request processing time, a number of a plurality of requests received by respective ones of a plurality of edge devices and/or fog devices 107, a frequency of the plurality of requests received by the respective ones of the plurality of edge devices and/or fog devices 107, CPU utilization of the respective edge devices and/or fog devices 107, memory utilization of the respective edge devices and/or fog devices 107, network bandwidth associated with the respective edge devices and/or fog devices 107, I/O data size associated with the respective edge devices and/or fog devices 107 and IOPS associated with the respective edge devices and/or fog devices 107.

In illustrative embodiments, the time series forecasting layer 131 utilizes a time series forecasting machine learning algorithm to build a time series forecasting model that will predict request traffic to each edge device and/or fog device 107 within a given time period (e.g., the next 24 hours, week, etc.). While edge devices can be the same devices that generate or collect data, as noted herein, fog devices 107 are nodes that are physically close to, but distinct from the edge devices. In a non-limiting example, some of the parameters used to forecast the workload of each edge device include, for example, request path, a number and/or frequency of requests received by respective edge devices, one or more services of a given edge device mapped to a given request, a priority of the one or more services of a given edge device mapped to a given request, a time needed to respond to a given request, a volume or number of communications to other edge devices that may be needed in order to respond to a given request, a number of requests received by respective edge devices that are synchronized to fog devices 107, CPU utilization of the respective edge devices, and/or network bandwidth associated with the respective edge devices.

In a non-limiting example, some of the parameters used to forecast the workload of each edge device include, for example, frequency of requests received by respective fog devices 107, a time needed to respond to a given request, a number of requests received by respective fog devices 107 that are synchronized to cloud environments, CPU utilization of the respective fog devices 107, and/or network bandwidth associated with the respective fog devices 107.

The prioritization engine 140 leverages the forecasted workloads from the workload prediction engine 130 to prioritize services required to respond to particular requests. For example, based on the mapping of respective ones of a plurality of requests received by the edge devices to one or more services offered by respective ones of the plurality of edge devices, the prioritization engine 140 assigns priority to at least a subset of a plurality of tasks that need to be performed to respond to requests, and ranks the one or more services offered by the respective ones of the plurality of edge devices based at least in part on the assigned priority. As a result, the prioritization engine 140 generates a priority list of the services required to process respective requests. The priority of services is a factor in determining whether services are to be moved from an edge device with a high workload to another edge device or fog device having a lower workload.

Figure 5:
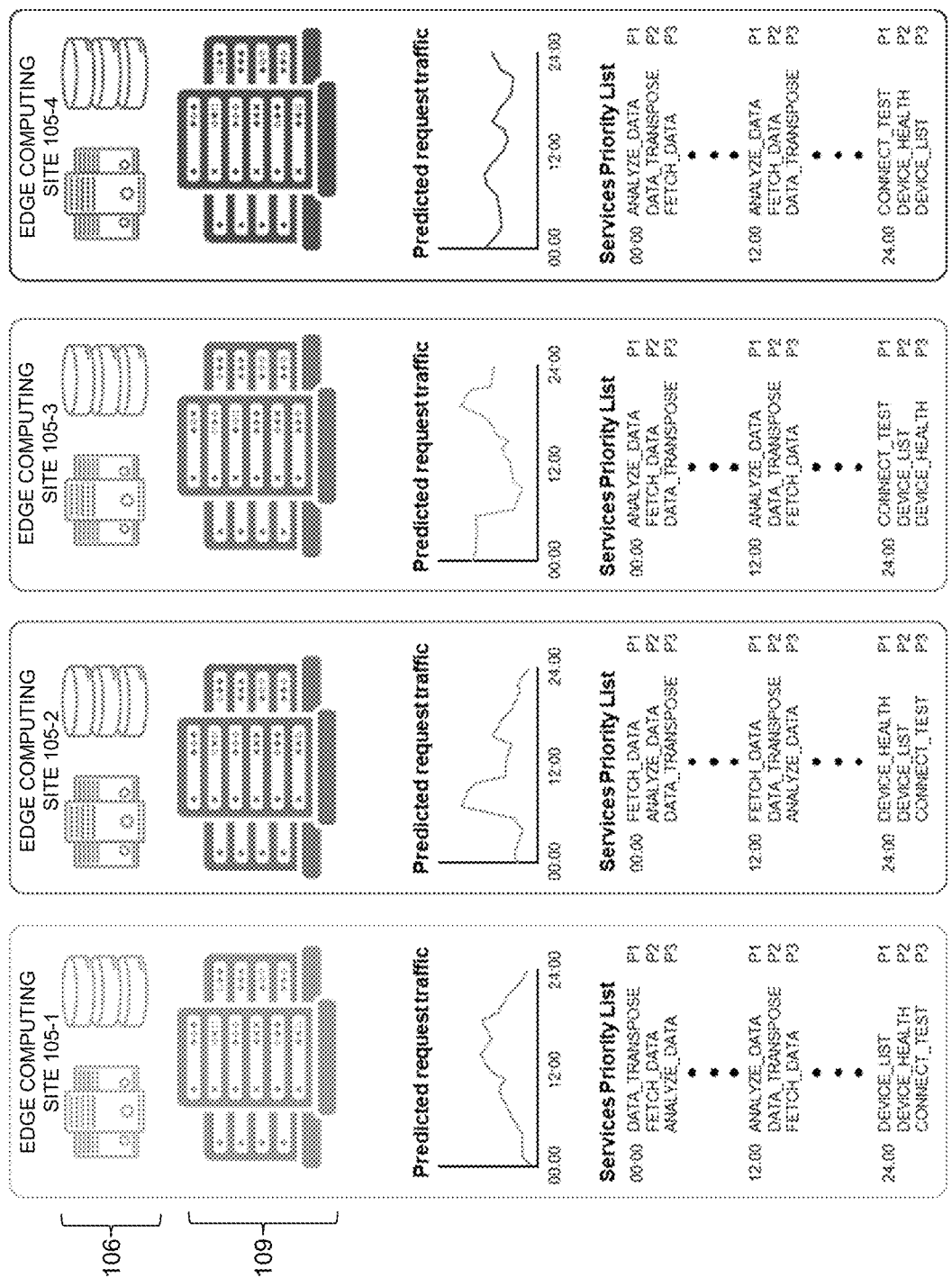
FIG. 5 depicts details of predicted request traffic and prioritization of services for a plurality of edge computing sites in an illustrative embodiment.

In a non-limiting illustrative example, the diagram 500 in FIG. 5 depicts details of predicted request traffic and prioritization of services for a plurality of edge computing sites 105-1, 105-2, 105-3 and 105-4. Each of the edge computing sites 105-1, 105-2, 105-3 and 105-4 includes edge compute, storage and/or network resources (collectively labeled 106) and a datacenter (collectively labeled 109). As can be seen in the diagram 500, each edge computing site 105 has predicted request traffic over 24 hours (00:00 to 24:00) generated by the workload prediction engine 130 and a services priority list generated by the prioritization engine 140. As can be seen, based on the predicted request traffic, the services may be prioritized differently at different times (e.g., 00:00, 12:00 and 24:00) in each of the edge computing sites 105. In addition, the services may be prioritized differently for respective ones of the edge computing sites 105 based on the predicted request traffic. For example, at a given time in a first one of the edge computing sites 105, certain services (e.g., DATA_TRANSPOSE, FETCH_DATA, ANALYZE_DATA, DEVICE_LIST, DEVICE_HEALTH and CONNECT_TEST), may be prioritized differently at the same given time in a second one of the edge computing sites 105. Also, within the same edge computing site 105, the same services may be prioritized differently at different times. Priority is indicated in the diagram 500 by the designation "P" followed by a number (e.g., P1, P2, P3).

Based at least in part on the predicted future workloads from the workload prediction engine 130, the control engine 150 determines whether to transfer at least a portion of one or more tasks from a first edge device at a first one of the edge computing sites 105 to a second edge device at a second one of the edge computing sites 105. The threshold determination layer 151 computes a threshold value for one or more workload metrics for the first and second edge devices. The determination of whether to transfer is further based at least in part on whether the transfer of at least the portion of the one or more of the plurality of the tasks from the first edge device to the second edge device will result in the threshold value for the one or more workload metrics being reached and/or exceeded at the second edge device. The one or more workload metrics comprise, for example, CPU utilization, memory utilization, network bandwidth, I/O data size, IOPS and/or other attributes used in connection with assessing workload described herein.

In a non-limiting operational example, the following is a threshold value calculation for IOPS of an edge device on which the determination of whether to transfer at least a portion of one or more tasks from the first edge device to a second edge device may be based. Every hard drive has a maximum theoretical IOPS value that is based on a formula. For example, disk performance and IOPS are based on: (i) rotational speed (also known as "spindle speed"); (ii) average latency; and (iii) average seek time. Rotational speed is measured in revolutions per minute (RPM). A higher RPM is associated with a higher performing disk. Average latency refers to the time it takes for a sector of the disk being accessed to rotate into position under a read/write head. Average seek time refers to the time (e.g., in milliseconds) that it takes for the hard drive's read/write head to position itself over the track being read or written. There are both read and write seek times. In illustrative embodiments, the average of the two values is considered.

To calculate the IOPS threshold associated with a hard drive, the following formula (3) is used by the threshold determination layer 151.

$$\text{Threshold } IOPS = \left(1/(\text{average latency in ms} + \text{average seek time in ms})\right) \quad (3)$$

A non-limiting example of the threshold IOPS calculation for a sample hard-drive is based on the following: Western Digital VelociRaptor 2.5" SATA hard drive; Rotational speed: 10,000 RPM, Average latency: 3 ms (0.003 seconds); Average seek time: 4.1 (read) and 4.8 (write)=(4.1+4.8)/2=4.45 ms (0.0045 seconds). The computed IOPS threshold for this disk is 1/(0.003+0.0045)=~133.

Based on the predicted workload from the workload prediction engine 130, and on the computed thresholds of one or more workload metrics determined by the threshold determination layer 151, the workload determination layer 152 determines whether the transfer of at least the portion of the one or more of the plurality of the tasks from the first edge device to the second edge device will result in the threshold values for the one or more workload metrics being reached and/or exceeded. For example, if the transfer results in a designated amount of one or more workload metrics (e.g., CPU utilization, memory utilization, network bandwidth, IOPS, etc.) remaining before their corresponding thresholds are reached, the edge device assignment layer will assign the one or more tasks to the second edge device. If the transfer results in less than a designated amount of the one or more workload metrics remaining before their corresponding thresholds are reached, the device assignment layer 153 will not assign the one or more tasks to the second edge device.

Figure 6:
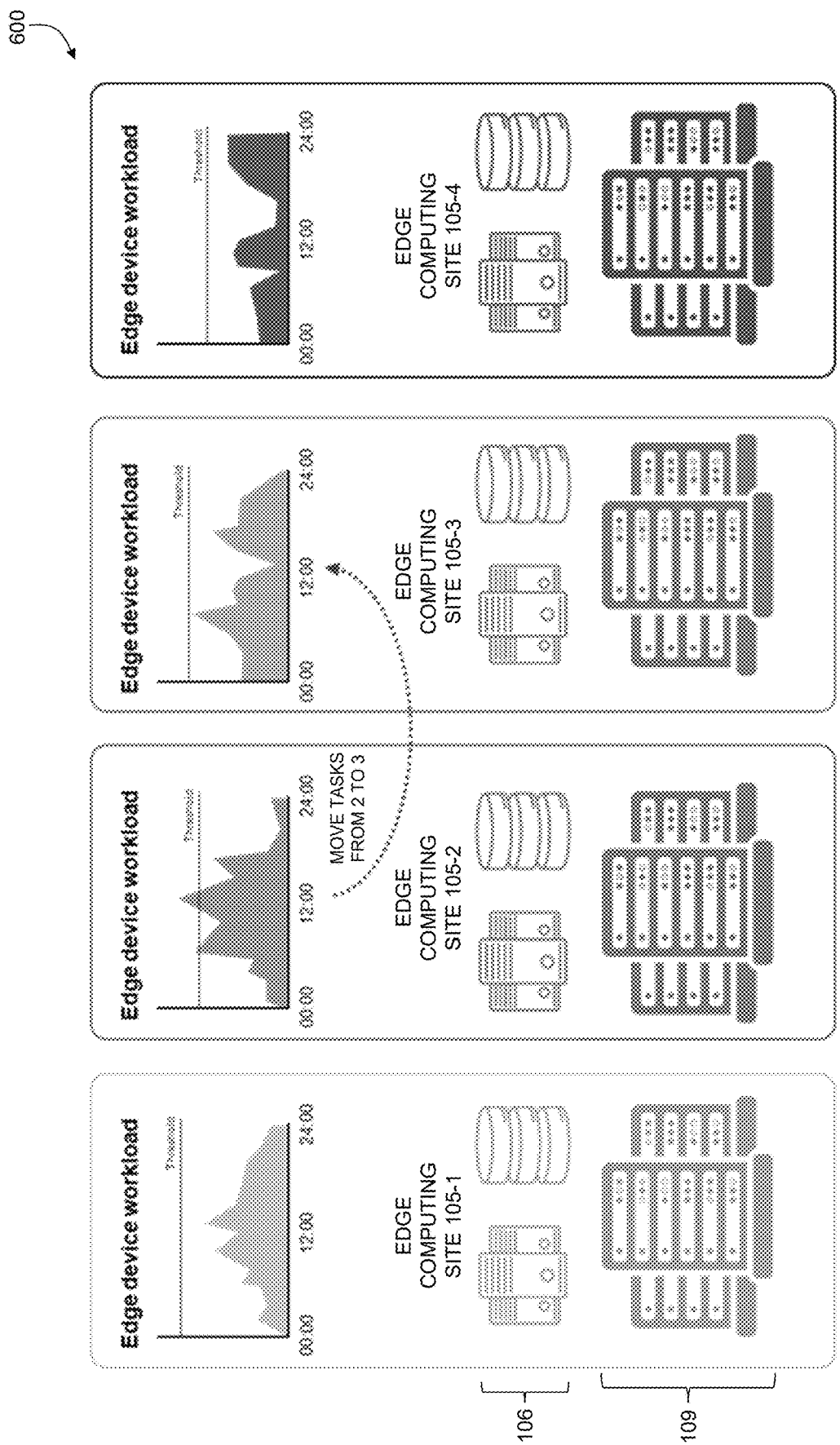
FIG. 6 depicts details of edge device workloads for a plurality of edge computing sites and movement of services between edge computing sites in an illustrative embodiment.

In a non-limiting illustrative example, the diagram 600 in FIG. 6 depicts details of predicted edge device workloads and whether they are below, reaching or exceeding at least one workload metric threshold for a plurality of edge computing sites 105-1, 105-2, 105-3 and 105-4. Similar to FIGS. 4 and 5, each of the edge computing sites 105-1, 105-2, 105-3 and 105-4 includes edge compute, storage and/or network resources (collectively labeled 106) and a datacenter (collectively labeled 109). In the diagram 600, the predicted edge device workload over a given time period (e.g., 24 hours) is shown with respect to a threshold for at least one workload metric for each edge computing site 105. The predicted edge device workloads for edge computing sites 105-1 and 105-4 are considerably below the threshold over the 24 hour period. The predicted edge device workload for edge computing site 105-2 is above and/or relatively close to the threshold at certain points over the 24 hour period, making the second computing site 105-2 a candidate for transfer of tasks to another edge computing site. As shown in FIG. 2, one or more tasks are determined to be moved from edge computing site 105-2 to edge computing site 105-3. The determination is based on the movement causing the predicted edge device workload for the edge computing site 105-3 over the given 24 hour period to remain below the threshold and reducing the predicted edge device workload for the edge computing site 105-2 to below the threshold for the given 24 hour period.

Depending on configuration, some workload metrics and their corresponding thresholds may be given more weight than other workload metrics and their corresponding thresholds. Also, users (e.g., administrators via administrator devices 108) may configure which workload metrics and/or groups of workload metrics to consider.

Additional factors used by the device assignment layer 153 when determining whether to transfer tasks from a first edge device at first edge computing site to a second edge device at second computing site include whether security of the first edge computing site is compatible with security of the second edge computing site, the time needed for performing the transfer, whether the transfer will satisfy conditions of a service level agreement (SLA), and a difference between network latency associated with the first edge device and a network latency associated with the second edge device. The determination of whether to transfer may be further based on the ranking of services offered by respective edge devices made by the prioritization engine 140. For example, tasks associated with higher ranked services may be transferred before tasks associated with lower ranked services.

As noted herein, in addition to or as an alternative to transferring tasks to other edge devices, tasks may be transferred to one or more fog devices 107. According to illustrative embodiments, the workload analysis engine 120 identifies one or more fog devices 107 corresponding to a first one of the edge computing sites 105 and/or a second one of the edge computing sites 105. In a manner similar to that used for the edge devices, using the regression machine learning algorithm, the workload analysis engine 120 determines workloads of respective ones of one or more fog devices 107, and the workload prediction engine 130 uses the time series forecasting machine learning algorithm to predict future workloads of respective ones of the one or more fog devices 107. Further, in a manner similar to that used for the edge devices, the control engine 150 analyzes workload metric thresholds associated with the one or more fog devices 107 to determine whether transfer of tasks to the one or more fog devices 107 can be performed as an alternative to or in addition to the transfer of tasks to the other edge devices. For example, a first portion of one or more of a plurality of the tasks can be transferred from a first edge device associated with a first one of the edge computing sites 105 to a second edge device associated with a second one of the edge computing sites 105, and a second portion of the one or more of the plurality of the tasks can be transferred from the first edge device to the one or more fog devices 107.

The validation engine 160, and more particularly, the assessment layer 161, executes periodic assessments to determine whether there is a difference between the predicted future workloads of the respective ones of the plurality of edge devices and actual workloads of the respective ones of the plurality of edge devices over the time period for which the prediction was made. Based on observed differences between the actual and predicted data, the re-prioritization layer 162 may re-prioritize tasks and re-transfer them between additional edge devices at the same or different ones of the edge computing sites 105, fog devices 107 and/or cloud platforms. For example, based on a determination of whether there is a difference between the predicted future workloads and the actual workloads, the re-prioritization layer 162 determines whether to transfer away from a particular edge device to another edge device and/or a fog device at least a portion of one or more of a plurality of the tasks that were previously transferred to the particular edge device. Using the workload metrics described herein above, the re-prioritization layer 162 determines re-prioritization and further transferring in a manner similar to that as performed by the control engine 150.

According to one or more embodiments, data repositories or databases referred to herein can be configured according to a relational database management system (RDBMS) (e.g., PostgreSQL). In some embodiments, data repositories or databases referred to herein are implemented using one or more storage systems or devices associated with the edge infrastructure management platform 110. In some embodiments, one or more of the storage systems utilized to implement data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the edge infrastructure management platform 110, the workload analysis engine 120, workload prediction engine 130, prioritization engine 140, control engine 150 and/or validation engine 160 in other embodiments can be implemented at least in part externally to the edge infrastructure management platform 110, for example, as stand-alone servers, sets of servers or other types of systems coupled to the network 104. For example, the workload analysis engine 120, workload prediction engine 130, prioritization engine 140, control engine 150 and/or validation engine 160 may be provided as cloud services accessible by the edge infrastructure management platform 110.

The workload analysis engine 120, workload prediction engine 130, prioritization engine 140, control engine 150 and/or validation engine 160 in the FIG. 1 embodiment are each assumed to be implemented using at least one processing device. Each such processing device generally comprises at least one processor and an associated memory, and implements one or more functional modules for controlling certain features of the workload analysis engine 120, workload prediction engine 130, prioritization engine 140, control engine 150 and/or validation engine 160.

At least portions of the edge infrastructure management platform 110 and the elements thereof may be implemented at least in part in the form of software that is stored in memory and executed by a processor. The edge infrastructure management platform 110 and the elements thereof comprise further hardware and software required for running the edge infrastructure management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the workload analysis engine 120, workload prediction engine 130, prioritization engine 140, control engine 150, validation engine 160 and other elements of the edge infrastructure management platform 110 in the present embodiment are shown as part of the edge infrastructure management platform 110, at least a portion of the workload analysis engine 120, workload prediction engine 130, prioritization engine 140, control engine 150, validation engine 160 and other elements of the edge infrastructure management platform 110 in other embodiments may be implemented on one or more other processing platforms that are accessible to the edge infrastructure management platform 110 over one or more networks. Such elements can each be implemented at least in part within another system element or at least in part utilizing one or more stand-alone elements coupled to the network 104.

It is assumed that the edge infrastructure management platform 110 in the FIG. 1 embodiment and other processing platforms referred to herein are each implemented using a plurality of processing devices each having a processor coupled to a memory. Such processing devices can illustratively include particular arrangements of edge compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the workload analysis engine 120, workload prediction engine 130, prioritization engine 140, control engine 150, validation engine 160 and other elements of the edge infrastructure management platform 110, and the elements thereof can each be implemented in the form of one or more LXCs running on one or more VMs. Other arrangements of one or more processing devices of a processing platform can be used to implement the workload analysis engine 120, workload prediction engine 130, prioritization engine 140, control engine 150 and validation engine 160, as well as other elements of the edge infrastructure management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the edge infrastructure management platform 110 to reside in different data centers. Numerous other distributed implementations of the edge infrastructure management platform 110 are possible.

Accordingly, one or each of the workload analysis engine 120, workload prediction engine 130, prioritization engine 140, control engine 150, validation engine 160 and other elements of the edge infrastructure management platform 110 can each be implemented in a distributed manner so as to comprise a plurality of distributed elements implemented on respective ones of a plurality of compute nodes of the edge infrastructure management platform 110.

It is to be appreciated that these and other features of illustrative embodiments are presented by way of example only, and should not be construed as limiting in any way. Accordingly, different numbers, types and arrangements of system elements such as the workload analysis engine 120, workload prediction engine 130, prioritization engine 140, control engine 150, validation engine 160 and other elements of the edge infrastructure management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the edge infrastructure management platform can be offered to cloud infrastructure customers or other users as part of FaaS, CaaS and/or PaaS offerings.

Figure 7:
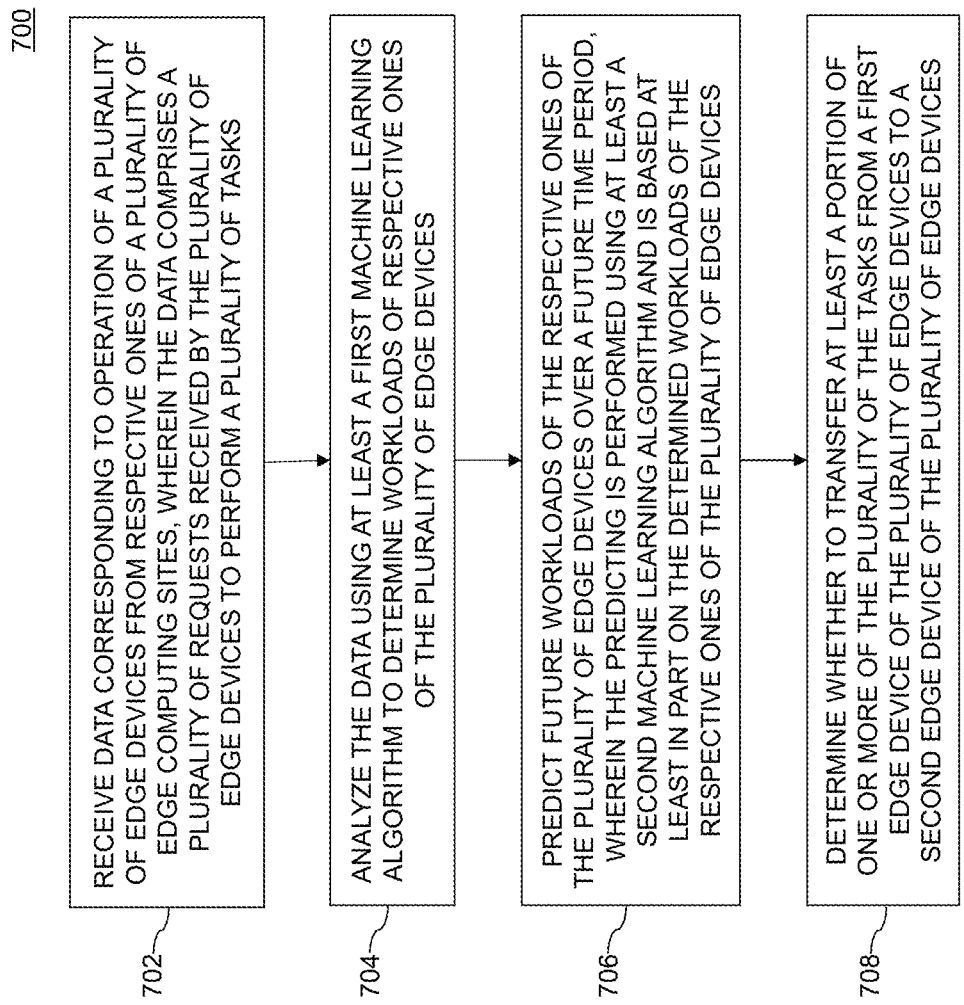
FIG. 7 depicts a process for management of workloads between edge devices according to an illustrative embodiment.

The operation of the information processing system 100 will now be described in further detail with reference to the flow diagram of FIG. 7. With reference to FIG. 7, a process 700 for edge infrastructure management as shown includes steps 702 through 708, and is suitable for use in the system 100 but is more generally applicable to other types of information processing systems comprising an edge infrastructure management platform configured for management of workloads between edge devices.

In step 702, data corresponding to operation of a plurality of edge devices is received from respective ones of a plurality of edge computing sites. The data comprises a plurality of requests received by the plurality of edge devices to perform a plurality of tasks.

In step 704, the data is analyzed using at least a first machine learning algorithm to determine workloads of respective ones of the plurality of edge devices. The first machine learning algorithm comprises a regression machine learning algorithm.

In step 706, future workloads of the respective ones of the plurality of edge devices are predicted over a future time period. The predicting is performed using at least a second machine learning algorithm and is based at least in part on the determined workloads of the respective ones of the plurality of edge devices. The second machine learning algorithm comprises a time series forecasting machine learning algorithm.

In step 708, a determination is made whether to transfer at least a portion of one or more of the plurality of the tasks from a first edge device of the plurality of edge devices to a second edge device of the plurality of edge devices. The first edge device is located at a first edge computing site and the second edge device is located at a second edge computing site. The determination of whether to transfer is based at least in part on one or more of the predicted future workloads. In response to an affirmative determination, at least the portion of the one or more of the plurality of the tasks is transferred from the first edge device to the second edge device.

The process may further comprise computing a threshold value for at least one workload metric for the second edge device, wherein the determination of whether to transfer is further based at least in part on whether the transfer of at least the portion of the one or more of the plurality of the tasks from the first edge device to the second edge device will result in the threshold value for the at least one workload metric being one of reached and exceeded. The at least one workload metric comprises at least one of CPU utilization, memory utilization, network bandwidth, I/O data size and IOPS.

In illustrative embodiments, the determination of whether to transfer is further based at least in part on at least one of whether security of the first edge computing site is compatible with security of the second edge computing site, and a difference between network latency associated with the first edge device and a network latency associated with the second edge device.

Respective ones of the plurality of requests may be mapped to one or more services offered by the respective ones of the plurality of edge devices. In addition, priority may be assigned to at least a subset of the plurality of tasks, and the one or more services offered by the respective ones of the plurality of edge devices can be ranked based at least in part on the assigned priority. The determination of whether to transfer is further based at least in part on the ranking.

In determining the workloads of respective ones of the plurality of edge devices, the first machine learning algorithm analyzes one or more workload metrics, wherein the one or more workload metrics comprise at least one of request type, request processing time, a number of the plurality of requests received by the respective ones of the plurality of edge devices, CPU utilization, memory utilization, network bandwidth, I/O data size and IOPS.

In predicting the future workloads of the respective ones of the plurality of edge devices, the second machine learning algorithm analyzes one or more workload metrics, wherein the one or more workload metrics comprise at least one of request path, request processing time, a number of the plurality of requests received by the respective ones of the plurality of edge devices, a frequency of the plurality of requests received by the respective ones of the plurality of edge devices, central processing unit utilization, memory utilization, network bandwidth, input-output data size and input-output operations per second.

According to illustrative embodiments, one or more fog devices corresponding to at least one of the first edge computing site and the second edge computing site are identified and future workloads of respective ones of the one or more fog devices are predicted. The determination of whether to transfer is further based at least in part on the predicted future workloads of the respective ones of the one or more fog devices. In one or more embodiments, at least a first portion of the one or more of the plurality of the tasks is transferred from the first edge device to the second edge device, and at least a second portion of the one or more of the plurality of the tasks is transferred from the first edge device to the one or more fog devices.

In an illustrative embodiment, following the transferring of at least the portion of the one or more of the plurality of the tasks to the second edge device, a determination is made whether there is a difference between the predicted future workloads of the respective ones of the plurality of edge devices and actual workloads of the respective ones of the plurality of edge devices over the future time period. Based at least in part on the determination of whether there is a difference between the predicted future workloads and the actual workloads, a determination is made whether to transfer at least the portion of the one or more of the plurality of the tasks from the second edge device to at least one of another edge device and a fog device.

It is to be appreciated that the FIG. 7 process and other features and functionality described above can be adapted for use with other types of information systems configured to execute edge infrastructure management services in an edge infrastructure management platform or other type of platform.

The particular processing operations and other system functionality described in conjunction with the flow diagram of FIG. 7 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an edge infrastructure management platform as disclosed herein can provide a number of significant advantages relative to conventional arrangements. For example, the edge infrastructure management platform uses machine learning to balance workloads across edge devices between different edge computing sites. Unlike conventional approaches, the embodiments forecast the workload of edge devices and fog devices, determine thresholds for designated workload metrics that may drain resources if exceeded, and base decisions on whether to transfer tasks to different edge devices and/or fog devices based on the thresholds. As an additional advantage, the embodiments prioritize and move tasks across edge and fog devices based on differences between predicted workloads, priority of tasks and several other factors (e.g., location of and compatibility between edge computing sites). As an additional advantage, unlike current techniques, illustrative embodiments provide technical solutions which assess if the actual workloads of the edge devices match with the predicted workloads, and continuously re-prioritize and re-transfer tasks based on the assessments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the edge infrastructure management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an edge infrastructure management platform in illustrative embodiments. These and other cloud-based systems in illustrative embodiments can include object stores.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
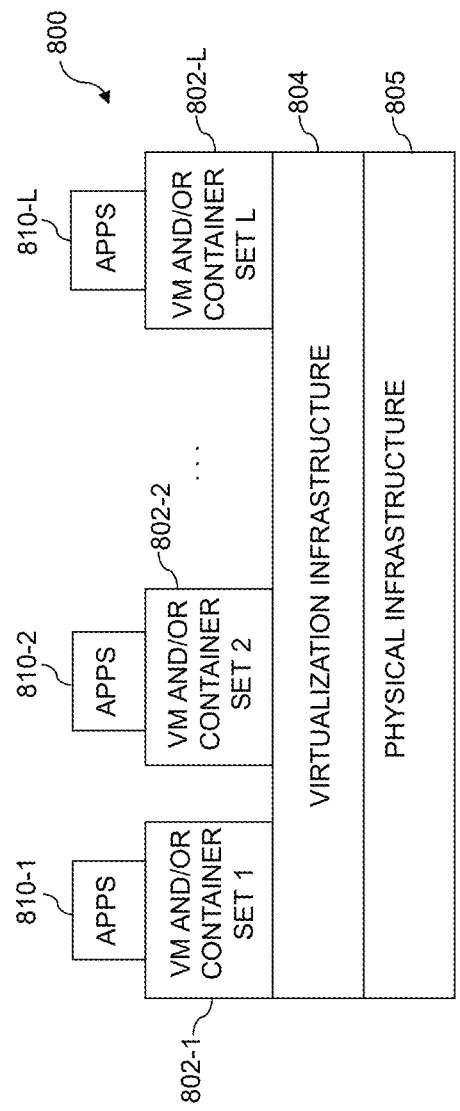
FIGS. 8 and 9 show examples of processing platforms that may be utilized to implement at least a portion of an information processing system according to illustrative embodiments.
Figure 9:
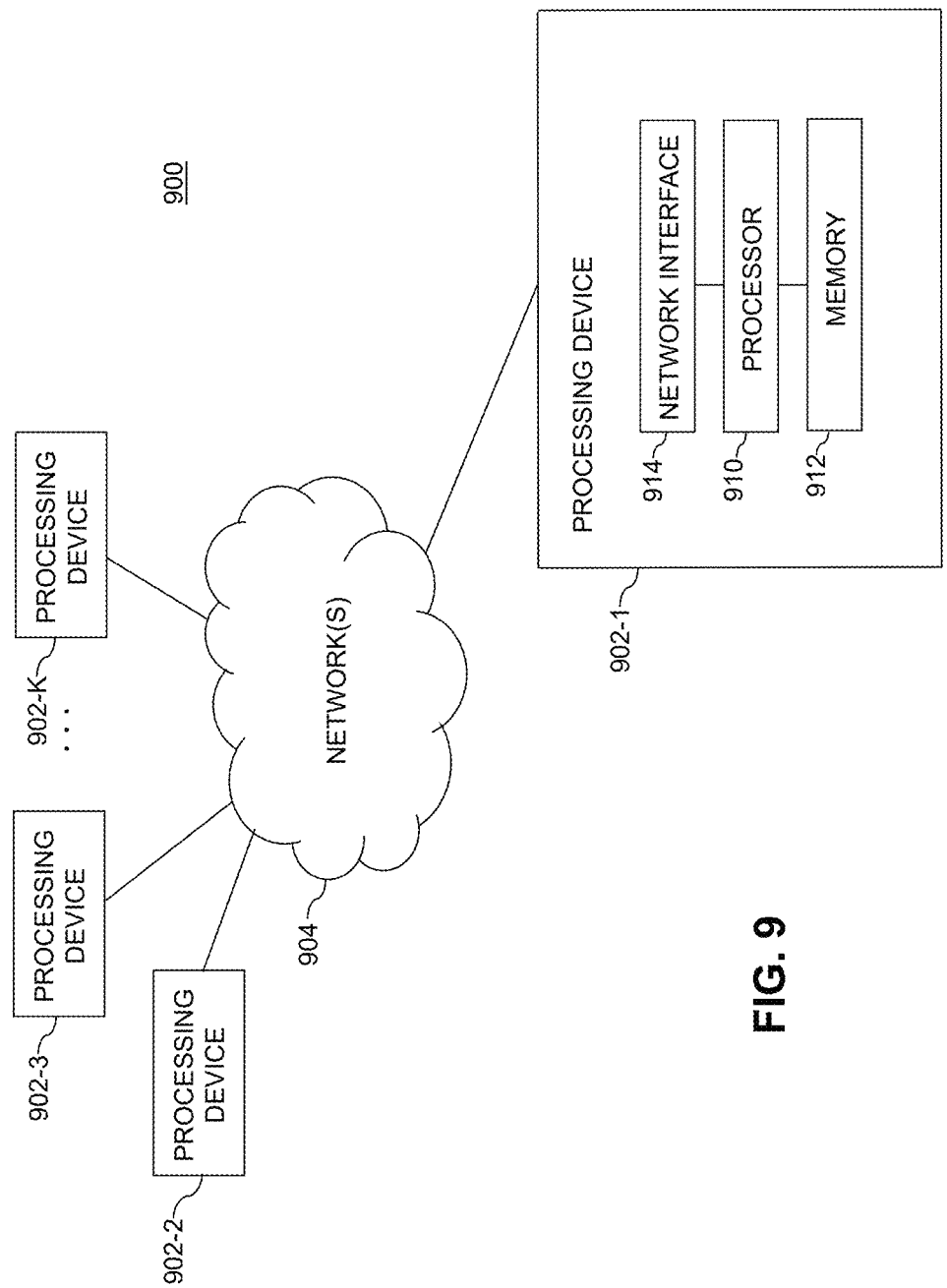

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2 . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912. The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the edge infrastructure management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and edge infrastructure management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   receiving data corresponding to operation of a plurality of edge devices from respective ones of a plurality of edge computing sites, wherein the data comprises a plurality of requests received by the plurality of edge devices to perform a plurality of tasks and one or more workload metrics associated with the plurality of requests;
   analyzing the data using a regression machine learning algorithm to determine workloads of respective ones of the plurality of edge devices, the determined workloads comprising one or more identified data and application components and sizes of the one or more identified data and application components;

inputting the determined workloads into a time series forecasting machine learning algorithm to generate a time series forecasting model to predict future workloads of the respective ones of the plurality of edge devices over a future time period, wherein the predicting is based at least in part on the determined workloads of the respective ones of the plurality of edge devices and the one or more workload metrics; and determining whether to transfer at least a portion of one or more of the plurality of the tasks from a first edge device of the plurality of edge devices to a second edge device of the plurality of edge devices based on the predicted future workloads and the determined workloads;

wherein the first edge device is located at a first edge computing site and the second edge device is located at a second edge computing site; and wherein the steps of the method are executed by a processor of a device operatively coupled to a memory.

2. The method of claim 1 wherein the regression machine learning algorithm comprises a ridge regression machine learning algorithm.

3. The method of claim 1 wherein the time series forecasting machine learning algorithm comprises a univariate time series dataset forecasting machine learning algorithm.

4. The method of claim 1 further comprising computing a threshold value for at least one workload metric of the one or more workload metrics for the second edge device, wherein the determination of whether to transfer is further based at least in part on whether the transfer of at least the portion of the one or more of the plurality of the tasks from the first edge device to the second edge device will result in the threshold value for the at least one workload metric being one of reached and exceeded.

5. The method of claim 4 wherein the at least one workload metric of the one or more workload metrics comprises at least one of central processing unit utilization, memory utilization, network bandwidth, input-output data size and input-output operations per second.

6. The method of claim 1 wherein the determination of whether to transfer is further based at least in part on at least one of whether security of the first edge computing site is compatible with security of the second edge computing site, and a difference between network latency associated with the first edge device and a network latency associated with the second edge device.

7. The method of claim 1 further comprising mapping respective ones of the plurality of requests to one or more services offered by the respective ones of the plurality of edge devices.

8. The method of claim 7 further comprising:
assigning priority to at least a subset of the plurality of tasks; and
ranking the one or more services offered by the respective ones of the plurality of edge devices based at least in part on the assigned priority;
wherein the determination of whether to transfer is further based at least in part on the ranking.

9. The method of claim 1 wherein, in determining the workloads of the respective ones of the plurality of edge devices, the regression machine learning algorithm analyzes the one or more workload metrics, wherein the one or more workload metrics comprise at least one of request type, request processing time, a number of the plurality of requests received by the respective ones of the plurality of edge devices, central processing unit utilization, memory utilization, network bandwidth, input-output data size and input-output operations per second.

10. The method of claim 1 wherein, in predicting the future workloads of the respective ones of the plurality of edge devices, the time series forecasting machine learning algorithm analyzes the one or more workload metrics, wherein the one or more workload metrics comprise at least one of request path, request processing time, a number of the plurality of requests received by the respective ones of the plurality of edge devices, a frequency of the plurality of requests received by the respective ones of the plurality of edge devices, central processing unit utilization, memory utilization, network bandwidth, input-output data size and input-output operations per second.

11. The method of claim 1 further comprising:
identifying one or more fog devices corresponding to at least one of the first edge computing site and the second edge computing site; and
predicting future workloads of respective ones of the one or more fog devices;
wherein the determination of whether to transfer is further based at least in part on the predicted future workloads of the respective ones of the one or more fog devices.

12. The method of claim 11 further comprising:
transferring at least a first portion of the one or more of the plurality of the tasks from the first edge device to the second edge device; and
transferring at least a second portion of the one or more of the plurality of the tasks from the first edge device to the one or more fog devices.

13. The method of claim 1 further comprising transferring at least the portion of the one or more of the plurality of the tasks from the first edge device to the second edge device.

14. The method of claim 13 further comprising:
determining whether there is a difference between the predicted future workloads of the respective ones of the plurality of edge devices and actual workloads of the respective ones of the plurality of edge devices over the future time period; and
determining whether to transfer at least the portion of the one or more of the plurality of the tasks from the second edge device to at least one of another edge device and a fog device based at least in part on the determination of whether there is a difference between the predicted future workloads and the actual workloads.

15. An apparatus comprising:
processor of a device operatively coupled to a memory and configured:
to receive data corresponding to operation of a plurality of edge devices from respective ones of a plurality of edge computing sites, wherein the data comprises a plurality of requests received by the plurality of edge devices to perform a plurality of tasks and one or more workload metrics associated with the plurality of requests;
to analyze the data using a regression machine learning algorithm to determine workloads of respective ones of the plurality of edge devices, the determined workloads comprising one or more identified data and application components and sizes of the one or more identified data and application components;
to input the determined workloads into a time series forecasting machine learning algorithm to generate a time series forecasting model to predict future workloads of the respective ones of the plurality of edge devices over a future time period, wherein the predicting is based at least in part on the determined workloads of the respective ones of the plurality of edge devices and the one or more workload metrics; and to determine whether to transfer at least a portion of one or more of the plurality of the tasks from a first edge device of the plurality of edge devices to a second edge device of the plurality of edge devices based on the predicted future workloads and the determined workloads; and wherein the first edge device is located at a first edge computing site and the second edge device is located at a second edge computing site.

16. The apparatus of claim 15 wherein the processor of the device is further configured to compute a threshold value for at least one workload metric of the one or more workload metrics for the second edge device, wherein the determination of whether to transfer is further based at least in part on whether the transfer of at least the portion of the one or more of the plurality of the tasks from the first edge device to the second edge device will result in the threshold value for the at least one workload metric being one of reached and exceeded.

17. The apparatus of claim 15 wherein the determination of whether to transfer is further based at least in part on at least one of whether security of the first edge computing site is compatible with security of the second edge computing site, and a difference between network latency associated with the first edge device and a network latency associated with the second edge device.

18. An article of manufacture comprising a non-transitory processor-readable storage medium having stored therein program code of one or more software programs, wherein the program code when executed by at least one processor of a device causes the at least one processor of the device to perform the steps of:

receiving data corresponding to operation of a plurality of edge devices from respective ones of a plurality of edge computing sites, wherein the data comprises a plurality of requests received by the plurality of edge devices to perform a plurality of tasks and one or more workload metrics associated with the plurality of requests;

analyzing the data using a regression machine learning algorithm to determine workloads of respective ones of the plurality of edge devices, the determined workloads comprising one or more identified data and application components and sizes of the one or more identified data and application components;

inputting the determined workloads into a time series forecasting machine learning algorithm to generate a time series forecasting model to predict future workloads of the respective ones of the plurality of edge devices over a future time period, wherein the predicting is based at least in part on the determined workloads of the respective ones of the plurality of edge devices and the one or more workload metrics; and determining whether to transfer at least a portion of one or more of the plurality of the tasks from a first edge device of the plurality of edge devices to a second edge device of the plurality of edge devices based on the predicted future workloads and the determined workloads; and wherein the first edge device is located at a first edge computing site and the second edge device is located at a second edge computing site.

19. The article of manufacture of claim 18 wherein the program code further causes said at least one processor of the device to perform the step of computing a threshold value for at least one workload metric of the one or more workload metrics for the second edge device, wherein the determination of whether to transfer is further based at least in part on whether the transfer of at least the portion of the one or more of the plurality of the tasks from the first edge device to the second edge device will result in the threshold value for the at least one workload metric being one of reached and exceeded.

20. The article of manufacture of claim 18 wherein the determination of whether to transfer is further based at least in part on at least one of whether security of the first edge computing site is compatible with security of the second edge computing site, and a difference between network latency associated with the first edge device and a network latency associated with the second edge device.

* * * * *